(12) United States Patent
Sabo

(10) Patent No.: US 11,697,247 B2
(45) Date of Patent: Jul. 11, 2023

(54) PRECISION MECHANISM FOR POSITIONING LOWER FACE OF ARTICLE AT BUILD PLANE

(71) Applicant: 3D Systems, Inc., Rock Hill, SC (US)

(72) Inventor: David Sabo, San Diego, CA (US)

(73) Assignee: 3D SYSTEMS, INC., Rock Hill, SC (US)

(*) Notice: Subject to any disclaimer, the term of this patent is extended or adjusted under 35 U.S.C. 154(b) by 614 days.

(21) Appl. No.: 16/926,264

(22) Filed: Jul. 10, 2020

(65) Prior Publication Data

US 2021/0008797 A1 Jan. 14, 2021

Related U.S. Application Data

(60) Provisional application No. 62/872,371, filed on Jul. 10, 2019.

(51) Int. Cl.
| | |
|---|---|
| *B29C 64/232* | (2017.01) |
| *B29C 64/25* | (2017.01) |
| *B29C 64/255* | (2017.01) |
| *B29C 64/124* | (2017.01) |
| *B29C 64/245* | (2017.01) |
| *B33Y 30/00* | (2015.01) |

(52) U.S. Cl.
CPC .......... *B29C 64/232* (2017.08); *B29C 64/124* (2017.08); *B29C 64/245* (2017.08); *B29C 64/25* (2017.08); *B29C 64/255* (2017.08); *B33Y 30/00* (2014.12)

(58) Field of Classification Search
CPC .................................................. B29C 64/232
See application file for complete search history.

(56) References Cited

U.S. PATENT DOCUMENTS

| | | | | |
|---|---|---|---|---|
| 4,590,787 A | * | 5/1986 | Trimborn | B30B 1/188 72/454 |
| 5,009,585 A | * | 4/1991 | Hirano | B29C 64/135 118/500 |
| 5,123,342 A | * | 6/1992 | Camossi | B30B 1/18 184/5 |
| 2006/0078638 A1 | * | 4/2006 | Holmboe | B33Y 70/00 425/174.4 |
| 2014/0052288 A1 | * | 2/2014 | El-Siblani | B29C 64/264 700/119 |
| 2015/0183168 A1 | * | 7/2015 | Liverman | B29C 64/135 425/166 |
| 2017/0259482 A1 | * | 9/2017 | Contractor | B33Y 30/00 |

* cited by examiner

*Primary Examiner* — Timothy Kennedy

(57) ABSTRACT

A three-dimensional printing system includes a vertical support beam, a resin vessel assembly coupled to the vertical support beam and including a resin vessel, and a support tray positioning system. The support tray positioning system includes a support tray elevator, a lead screw nut, a motorized lead screw, an intermediate nut, and a linear bearing. The motorized lead screw engages the lead screw nut to raise and lower the support tray elevator. The linear bearing constrains motion of the support tray elevator to vertical motion. The support tray elevator, the intermediate nut, and the lead screw nut interlock to constrain rotational motion of the lead screw nut with respect to the support tray elevator while allowing for two dimensional lateral motion of the lead screw nut with respect to the support tray elevator to accommodate mechanical tolerances of the lead screw with respect to the linear bearing.

17 Claims, 5 Drawing Sheets

PRECISION MECHANISM FOR POSITIONING LOWER FACE OF ARTICLE AT BUILD PLANE

CROSS-REFERENCE TO RELATED APPLICATIONS

This non-provisional patent application claims priority to U.S. Provisional Application Ser. No. 62/872,371, Entitled "PRECISION MECHANISM FOR POSITIONING LOWER FACE OF ARTICLE AT BUILD PLANE" by David Sabo, filed on Jul. 10, 2019, incorporated herein by reference under the benefit of U.S.C. 119(e).

FIELD OF THE INVENTION

The present disclosure concerns an apparatus and method for fabrication of solid three dimensional (3D) articles of manufacture from radiation curable (photocurable) resins or other materials. More particularly, the present disclosure improves speed and accuracy of a precision vertical movement.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support tray, and a controllable light engine. The stereolithography system forms a three dimensional (3D) article of manufacture by selectively curing layers of the photocurable resin onto the support tray. Each selectively cured layer is formed at a "build plane" within the resin. As layers are formed onto the support tray, the movement mechanism moves the support tray vertically to compensate for an added material thickness. One challenge with such systems is to provide precision vertical movements with the movement mechanism.

SUMMARY

Figure 1:
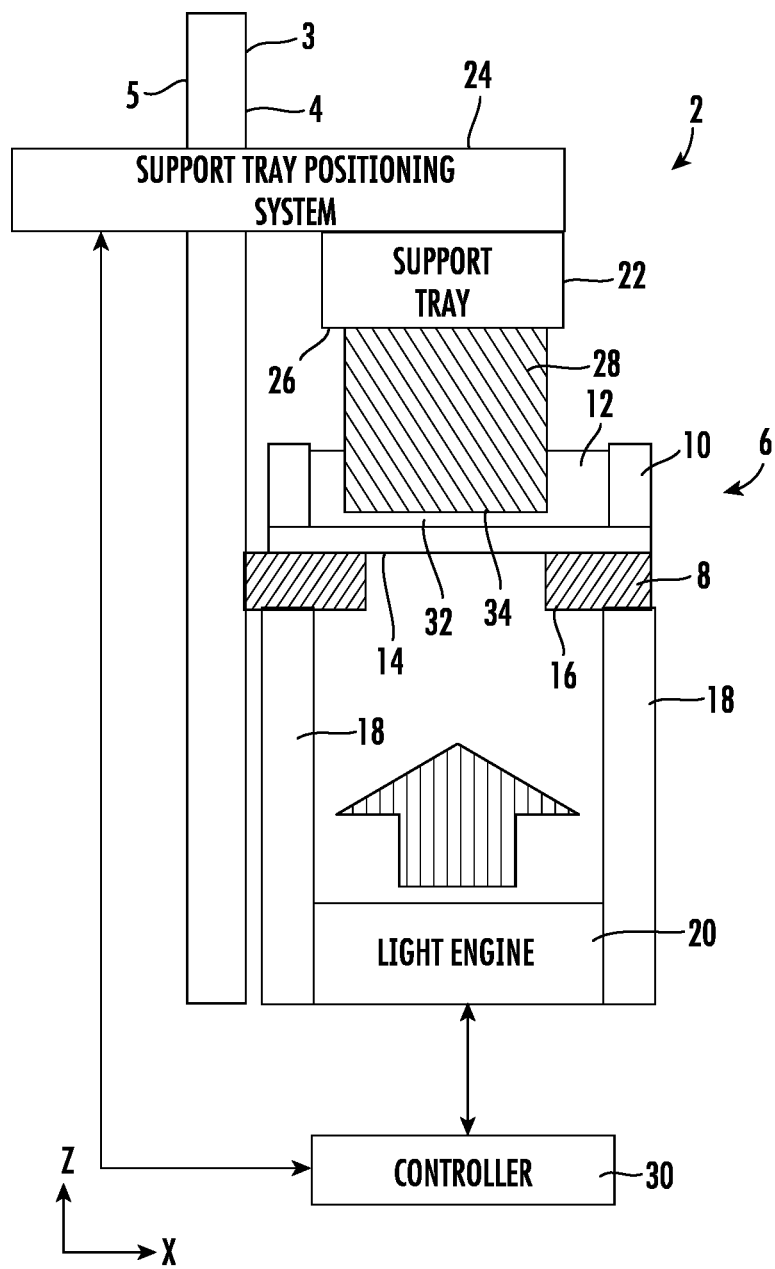
FIG. 1 is a block diagram schematic of an embodiment of a three-dimensional printing system.

In a first aspect of the disclosure, a three-dimensional printing system includes a vertical support beam, a resin vessel assembly coupled to the vertical support beam and including a resin vessel, and a support tray positioning system. The support tray positioning system includes a support tray elevator, a lead screw nut, a motorized lead screw, an intermediate nut, and a linear bearing. The support tray elevator includes a rear portion and a pair of arms. The rear portion is proximate to the vertical support beam and has a lower facing surface. The pair of arms extend from the rear portion in a forward direction and support a support tray above the resin vessel. The lead screw nut is coupled to the lateral side of the rear portion and defines a central threaded opening. The motorized lead screw has a vertical axis and is received into the central threaded opening of the lead screw nut. Rotation of the motorized lead screw about the vertical axis raises and lowers the lead screw nut together with the support tray elevator. The intermediate nut is sandwiched between the lower facing surface of the rear portion and the lead screw nut. The linear bearing slides along the main vertical support along the vertical axis. The linear bearing is coupled to the rear portion and constrains motion of the support tray elevator to linear vertical motion without rotation. The lower facing surface of the rear portion, the intermediate nut, and the lead screw nut form an interlocking structure. The interlocking structure constrains relative motion of the lead screw nut to the support tray elevator to restrict relative rotational motion while allowing for relative lateral motion to accommodate mechanical tolerances of the lead screw and lead screw nut interaction with respect to the linear bearing constraint.

In one implementation, the vertical beam has a front side and a rear side. The linear bearing is slidingly mounted to the rear side of the vertical support beam. The rear portion of the support tray elevator is mounted to a rearward facing portion of the linear bearing. The rear portion extends laterally beyond a lateral extent of the vertical support beam on two sides. The pair of arms individually extend forwardly beyond the vertical support beam.

In a second aspect of the disclosure, a three-dimensional printing system includes a vertical support beam, a resin vessel assembly coupled to the vertical support beam and including a resin vessel, and a support tray positioning system. The support tray positioning system includes a support tray elevator, a lead screw nut, a motorized lead screw, an intermediate nut, and a linear bearing. The support tray elevator includes a rear portion and a pair of arms. The rear portion is proximate to the vertical support beam and has a lower facing side. The pair of arms extend from the rear portion in a forward direction and support a support tray above the resin vessel. The intermediate nut has an upper side facing the lower facing side of the rear portion and also has a lower side. The lead screw nut has an upper side facing the lower side of the intermediate nut and defines a central threaded opening. The motorized lead screw has a vertical axis and is received into the central threaded opening of the lead screw nut. Rotation of the motorized lead screw about the vertical axis raises and lowers the lead screw nut and the support tray elevator. The linear bearing slides along the main vertical support beam along the vertical axis. The linear bearing is coupled to the rear portion to constrain motion of the rear portion to vertical motion. The rear portion, the intermediate nut, and the lead screw nut collectively define two pairs of elongate openings including a first pair of openings and a second pair of openings and include two pairs of pins including a first pair of pins that extend into the first pair of openings and a second pair of pins that extend into the second pair of openings. Interactions between the pins and the elongate openings constrains rotational motion of the lead screw nut with respect to the rear portion along the vertical axis while allowing for lateral motion of the lead screw nut with respect to the rear portion to accommodate mechanical tolerances of the lead screw with respect to the linear bearing.

In one implementation the first pair of pins extend downwardly from the rear portion. The first pair of elongate openings are defined in the intermediate nut.

In another implementation the second pair of pins extend downwardly from the intermediate nut. The first pair of elongate openings are defined in the lead screw nut.

In yet another implementation the first pair of elongate openings have an aligned pair of major axes along a first direction. The second pair of elongate openings have an aligned pair of major axes along a second direction that is not parallel to the first direction to allow for two dimensional lateral motion of the lead screw nut with respect to the rear portion.

DETAILED DESCRIPTION OF THE PREFERRED EMBODIMENTS

FIG. 1 is a block diagram schematic of an embodiment of a three-dimensional printing system 2. In describing system 2, mutually perpendicular axes X, Y, and Z will be utilized in various views. Axes X and Y are lateral axes that are generally horizontal. Axis Z is a vertical axis that is generally aligned with a gravitational reference. Upwardly is in the +Z direction and downwardly is in the −Z direction. An upper surface generally faces upwardly and a lower surface generally faces downwardly. Forward or forwardly generally means in the +X direction. Backward generally means −X. Side to side directions are along the Y-axis. "Generally" means by design and to within manufacturing and design tolerances but not exact.

A vertical support beam 4 is coupled to a resin vessel assembly 6. Vertical support beam 4 has a front side 3 and a rear side 5 with respect to the X-axis. Resin vessel assembly 6 includes a support plate 8 that is coupled to the vertical support beam 4. The support plate 8 supports a resin vessel 10 containing a photocurable resin 12. Resin vessel 10 includes a transparent sheet 14 on a lower side that defines a lower bound for resin 12 contained in the resin vessel 10.

Extending downwardly from a downward-facing surface 16 of the support plate 8 are a plurality of struts 18. The struts 18 support a light engine 20 at a fixed distance from the support plate 8. The light engine 20 projects light up through the transparent sheet 14 to define a build plane 32 that is proximate to a lower face 34 of the three-dimensional article 28.

A support tray 22 is coupled to a support tray positioning system 24. Support tray 22 has a lower surface 26 supporting a three-dimensional article 28 that is being manufactured by system 2. A controller 30 is controllably coupled to the light engine 20 and the support tray positioning system 24.

The controller 30 includes a processor and an information storage device. The information storage device includes a non-transient or non-volatile storage device storing software instructions. When executed by the processor, the software instructions operate the light engine 20 and the support tray positioning system 24 to fabricate the three-dimensional article 28 in a layer-by-layer manner. The controller can be embodied at one location or multiple locations within and/or outside of the three-dimensional printing system 2.

In one embodiment, the controller 30 is configured to manufacture a three-dimensional article 28 using the following steps: (1) Operate the support tray positioning system 24 to position the lower surface 26 of support tray 22 at the build plane 32. (2) Operate the light engine 30 to selectively cure resin 12 at the build plane 32 which accretes onto the lower surface 26 of the support tray 22. (3) Operate the support tray positioning system 24 to position a lower face 34 of cured resin at the build plane 32. (4) Repeat step (2). Then, repeat steps (3) and (4) to selectively accrete remaining layers of resin onto the lower face 34 to complete fabrication of the three-dimensional article 28.

Figure 2:
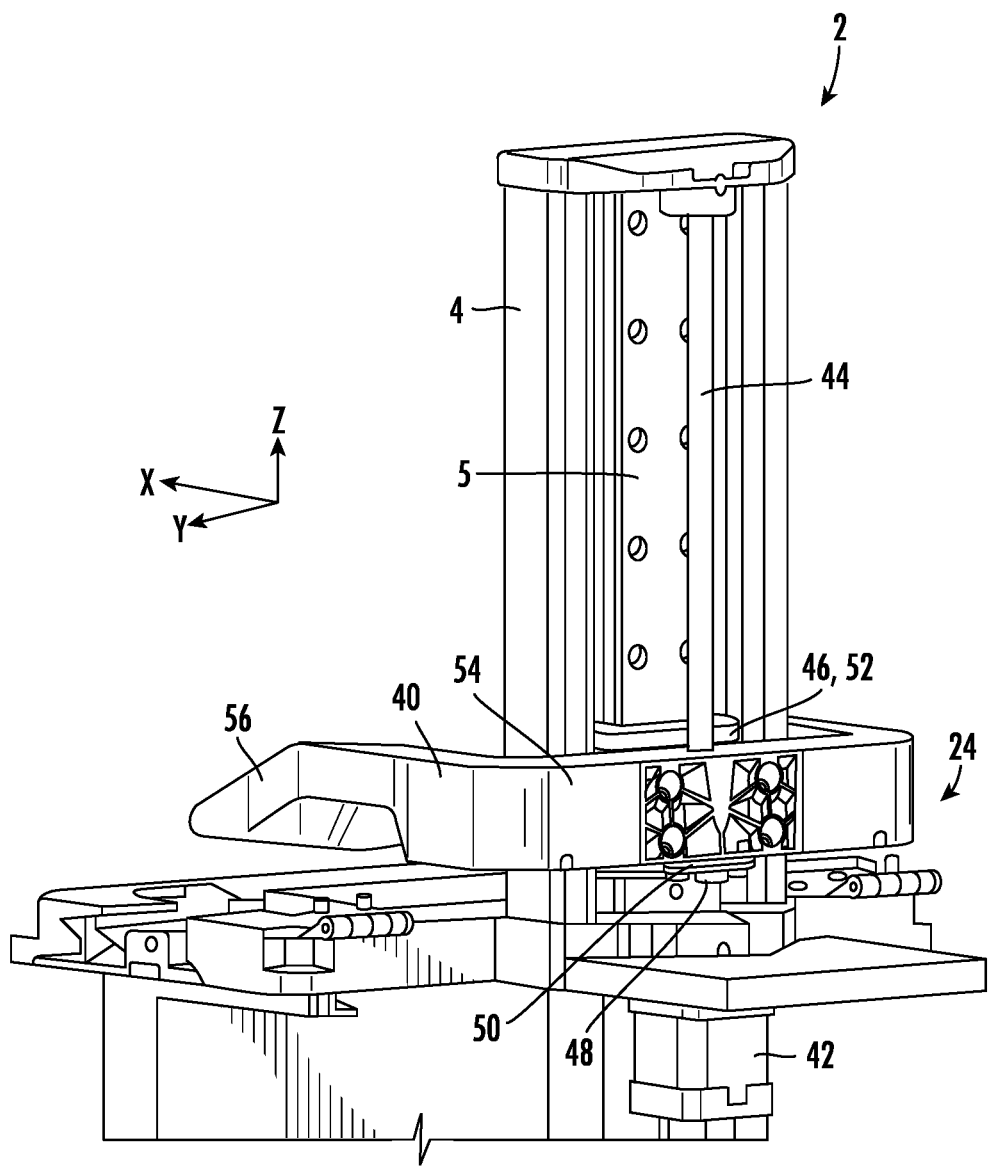
FIG. 2 is an isometric view of an embodiment of a portion of the three-dimensional printing system with emphasis on a support tray positioning system.

FIG. 2 is an isometric view of an embodiment of a portion of the three-dimensional printing system 2 with emphasis on the support tray positioning system 24. Additional details of the support tray positioning system 24 are shown in FIGS. 3, 4, 5A, and 5B. The support tray positioning system 24 includes a support tray elevator 40, a motor 42, a lead screw 44, a linear bearing 46, a lead screw nut 48, and an intermediate nut 50.

The motor 42 and lead screw 44 are positioned proximate to the rear side 5 of the vertical support beam 4. The linear bearing 46 is mounted to the rear side 5 of the vertical support beam 4 and is configured to slide along the vertical Z-axis with low friction. The linear bearing 46 has a rear side 52.

The support tray elevator 40 includes a rear portion 54 and a pair of arms 56. The rear portion 54 is mounted to the rear side 52 of the linear bearing 46. Rear portion 54 extends along the Y-axis beyond the extent of the vertical support beam 4 on both sides with respect to the Y-axis. Extending forwardly along the X-axis from two ends of the rear portion is a pair of arms 56 for supporting and aligning the support tray 22.

The linear bearing 46 constrains motion of the support tray elevator 40 to linear motion along the Z-axis. This includes severely limiting any lateral or rotational motion to allow for precision and repeatable motion for positioning the support tray 22.

Figure 3:
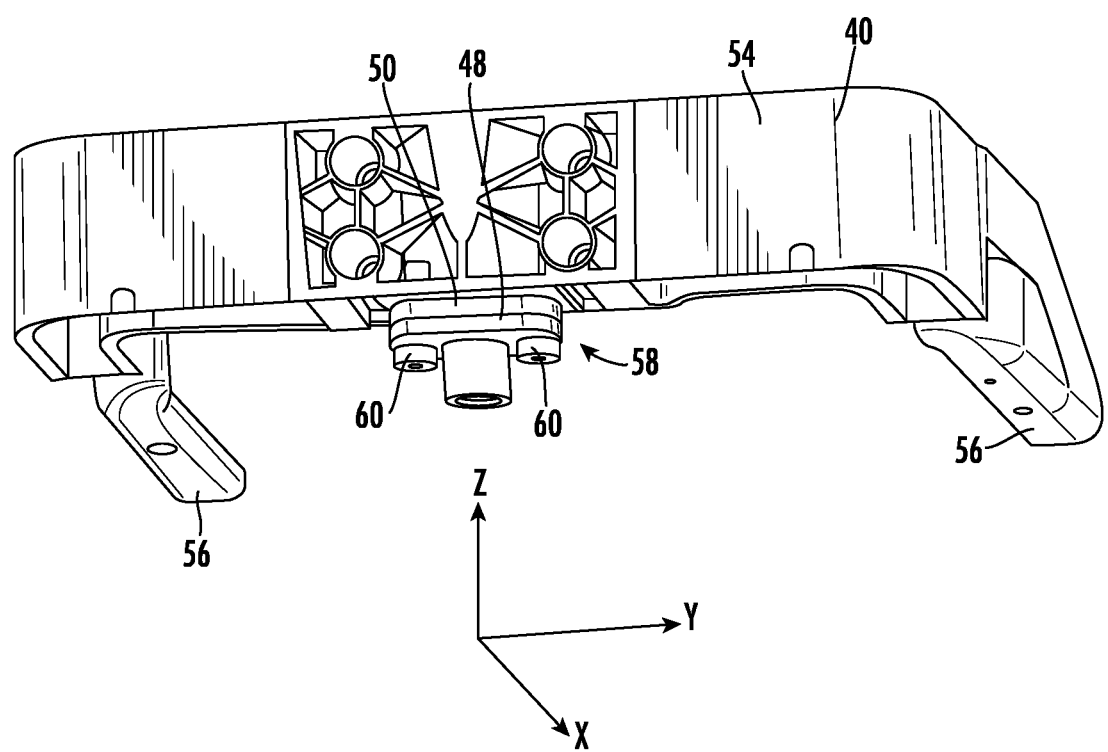
FIG. 3 is an isometric view of portions of an embodiment of a support tray positioning system including a support tray elevator, a lead screw nut, and an intermediate nut.

FIG. 3 is an isometric view of portions of the support tray positioning system 24 including the support tray elevator 40, lead screw nut 48, and intermediate nut 50. The support tray elevator includes a major axis along the lateral Y-axis, an intermediate axis along the lateral X-axis, and a minor axis along the vertical Z-axis. The rear portion 54 extends along the major axis along Y. The pair of arms 56 extend along the intermediate axis X. As shown, the intermediate nut 50 is "sandwiched" between the rear portion 54 and the lead screw nut 48.

As will be explained later in more detail, the rear portion 54, the intermediate nut 50, and the lead screw nut 48 form an interlocking structure 58 which constrains rotational motion of the lead screw nut 48 with respect to the rear portion 54 along the vertical Z-axis while allowing for two dimensional lateral motion of the lead screw nut 48 with respect to the rear portion 54 along the lateral axes X and Y.

A pair of bolts 60 secure the lead screw nut 48 and the intermediate nut 50 to the rear portion 54. The bolts 60 are sized in length and diameter to allow the lateral motion of the lead screw nut 48 with respect to the rear portion 54.

Figure 4:
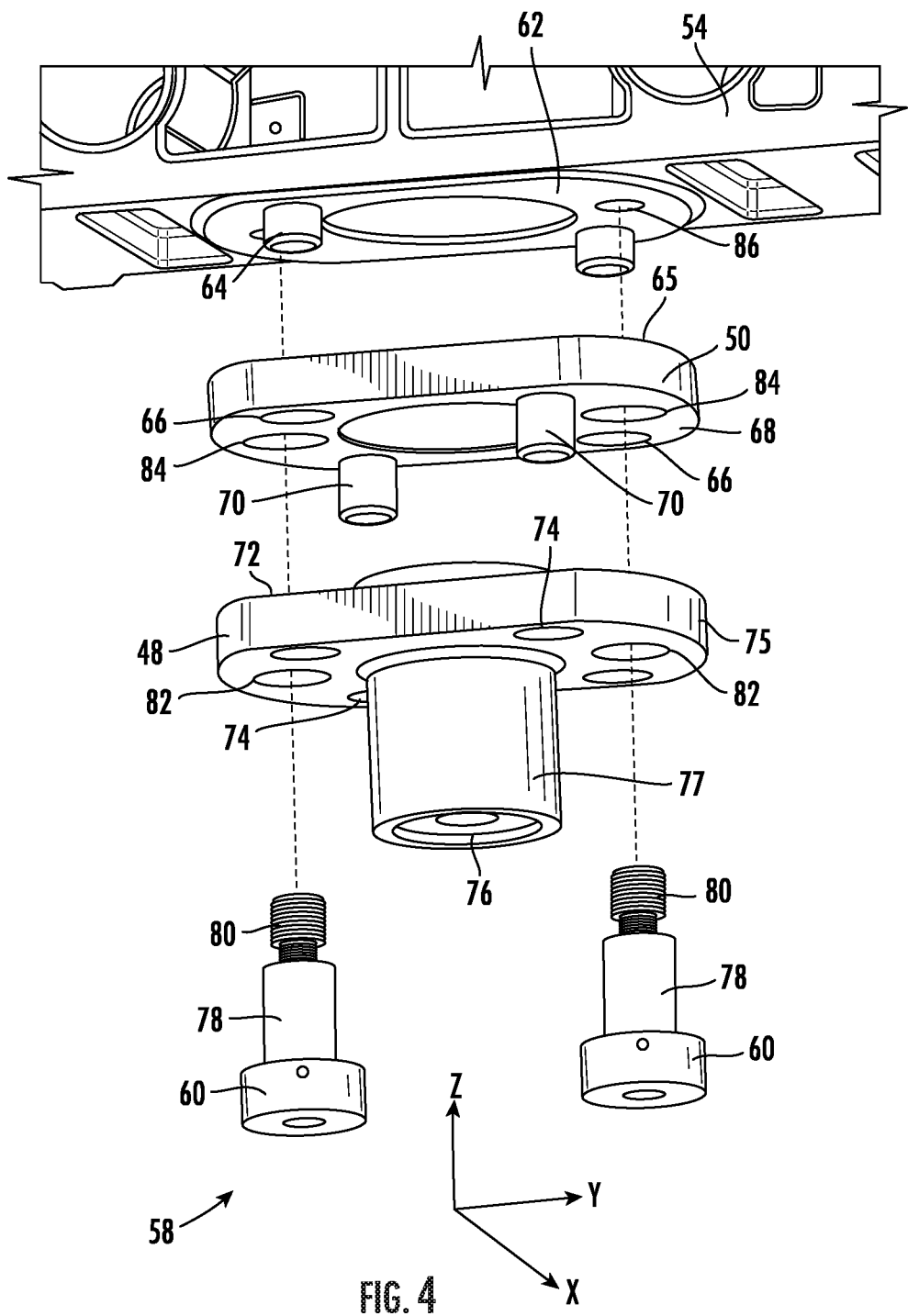
FIG. 4 is an exploded isometric view of an embodiment of an interlocking structure.

FIG. 4 is an exploded isometric view of an embodiment of the interlocking structure 58. The rear portion 54 of the support tray elevator 40 has a lower facing surface 62 from which two pins 64 extend downwardly.

The intermediate nut 50 has an upper side 65 that faces the lower facing surface 62 of the rear portion 54. The intermediate nut 50 defines two elongate openings 66 for receiving the pins 64. The intermediate nut 50 has a lower side 68 from which two pins 70 extend downwardly.

The lead screw nut 48 has an upper side 72 that faces the lower side 68 of the intermediate nut 50. The lead screw nut 48 defines two elongate openings 74 for receiving the pins 70.

The lead screw nut 48 defines a central threaded opening 76 that receives the lead screw 44 to allow rotation of the lead screw 44 about vertical axis Z to raise and lower the lead screw nut 44 and the support tray elevator 40. The lead screw nut 48 includes a flat base 75 that defines openings 74 and a cylindrical extension 77 that provides a greater vertical dimension for the central threaded opening 76. Cylindrical extension 77 extends downwardly from the flat base 75 and can also extend upwardly from the upper side 72.

The two bolts 60 individually have a cylindrical section 78 and threads 80. The cylindrical sections 78 pass through a pair of openings 82 in the lead screw nut 48 and through a pair of openings 84 in the intermediate nut 50. The threads 80 are received into threaded openings 86 in the lower facing surface 62 to secure the lead screw nut 48 and the intermediate nut 50 to the lower facing surface 62 of rear portion 54.

The cylindrical sections 78 have a diameter that is less than a diameter of the pairs of openings 82 and 84 and a length that is greater than a combined thickness of flat portions of the lead screw nut 48 and the intermediate nut 50 so that the lead screw nut 48 can "float" laterally in two axes.

Figure 5A:
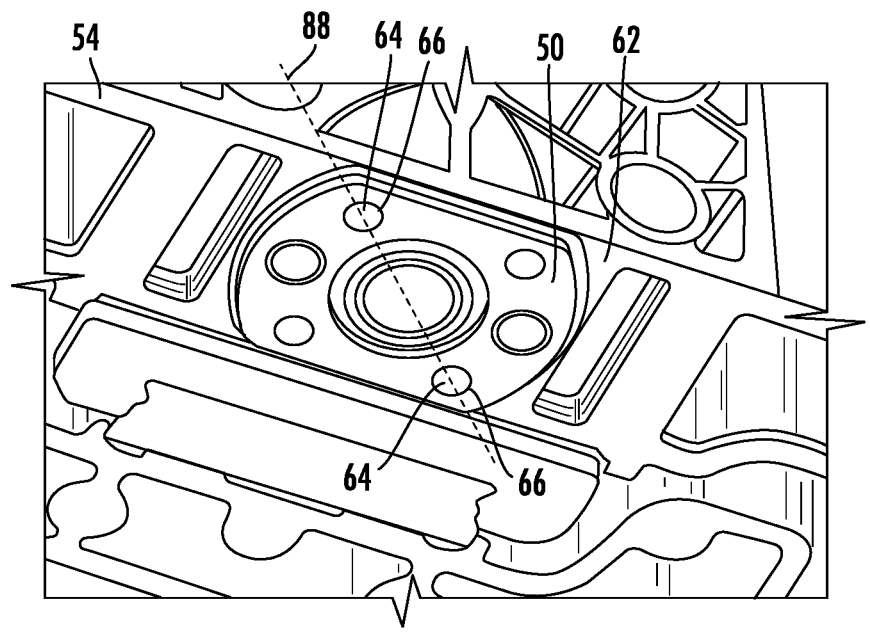
FIG. 5A is an isometric cutaway view of an intermediate nut mounted to a lower facing side of a rear portion of a support tray elevator.

FIG. 5A is an isometric cutaway view of the intermediate nut 50 mounted to the lower facing side 62 of the rear portion 54. The pair of pins 64 extending downwardly from the lower facing side 62 are shown extending into the two elongate openings 66 defined by the intermediate nut 50. The elongate openings 66 individually have a major axis that is aligned with a lateral axis 88. The elongate opening geometry allows lateral motion of the intermediate nut 50 (and hence also the lead screw nut 48) with respect to the rear portion 54 along the lateral axis 88.

Figure 5B:
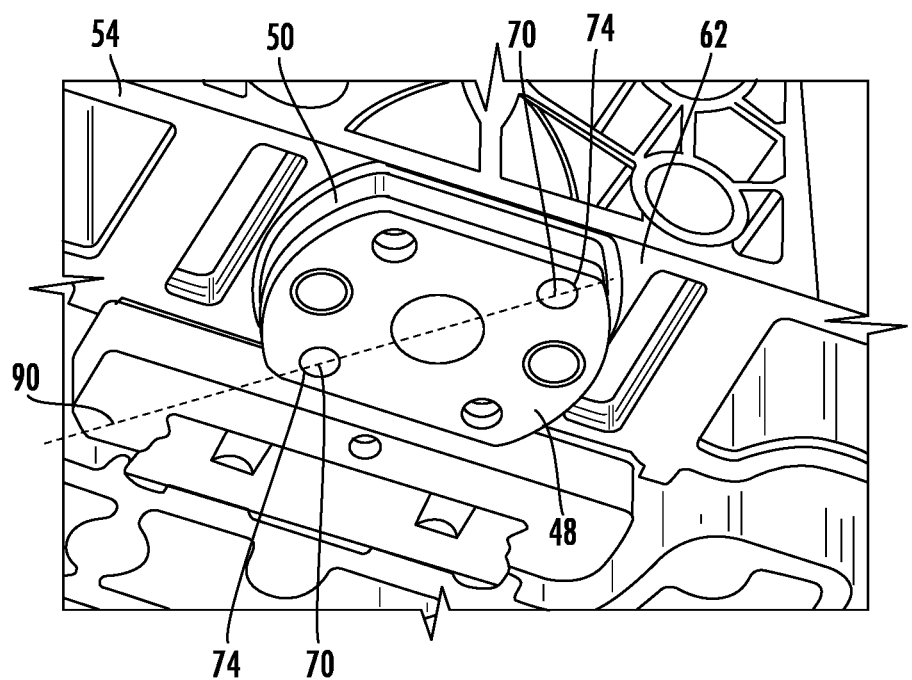
FIG. 5B is an isometric cutaway view of an intermediate nut and lead screw nut mounted to a lower facing side of a rear portion of a support tray elevator. In this cutaway view a cylindrical extension of the lead screw nut has been cut away for viewing simplicity.

FIG. 5B is an isometric cutaway view of the intermediate nut 50 and the lead screw nut 48 mounted to the lower facing side 62 of the rear portion 54. In FIG. 5B, the cylindrical extension 77 has been cut away for simplicity. The pair of pins 70 extending downwardly from the lower side 68 are shown extending into the elongate openings 74 defined by the lead screw nut 48. The elongate openings 74 individually have a major axis that is aligned with a lateral axis 90. The elongate opening geometry allows lateral motion of the lead screw nut 48 with respect to the intermediate nut 50 and hence with respect to the rear portion 54 along the lateral axis 90.

Considering FIGS. 5A and 5B, the lateral axes 88 and 90 are non-parallel so that the lead screw nut 48 can move or "float" laterally in two dimensions with respect to the rear portion 54. In an illustrative embodiment, the axes 88 and 90 are generally or nearly at right angles with respect to each other to maximize the degree of two dimensional float.

The specific embodiments and applications thereof described above are for illustrative purposes only and do not preclude modifications and variations encompassed by the scope of the following claims.

What is claimed:

1. A three-dimensional printing system for fabricating a three-dimensional article comprising:
   a vertical support beam;
   a resin vessel assembly coupled to the vertical support beam and including a resin vessel;
   a support tray positioning system including:
      a support tray elevator including:
         a rear portion that is proximate to the vertical support beam and having a lower facing surface; and
         a pair of arms that extend from the rear portion in a forward direction, the pair of arms configured to support a support tray above the resin vessel;
      a lead screw nut coupled to the lower facing surface of the rear portion and defining a central threaded opening;
      a motorized lead screw having a vertical axis and received into the central threaded opening of the lead screw nut, rotation of the motorized lead screw about the vertical axis raises and lowers the lead screw nut together with the support tray elevator;
      an intermediate nut sandwiched between the lower facing surface of the rear portion and the lead screw nut; and
      a linear bearing that slides along the main vertical support beam along the vertical axis, the linear bearing is coupled to the rear portion and constrains motion of the support tray elevator to vertical motion without rotation;
      the lower facing surface of the rear portion, the intermediate nut, and the lead screw nut form an interlocking structure that constrains relative motion of the lead screw nut to the support tray elevator to restrict relative rotational motion while allowing for relative lateral motion to accommodate mechanical tolerances of the lead screw and lead screw nut interaction with respect to the linear bearing constraint.

2. The three-dimensional printing system of claim 1 wherein the vertical support beam has a front side and a rear side, the linear bearing is slidingly mounted to the rear side of the vertical support beam.

3. The three-dimensional printing system of claim 2 wherein the rear portion is mounted to a rearward facing portion of the linear bearing.

4. The three-dimensional printing system of claim 3 wherein the rear portion extends laterally beyond a lateral extent of the vertical support beam on two sides, the pair of arms individually extend forwardly beyond the vertical support beam.

5. The three-dimensional printing system of claim 1 wherein the lead screw nut includes a flat base and a cylindrical extension that extends downwardly from the flat base, the cylindrical extension provides a vertical distance for the central threaded opening.

6. The three-dimensional printing system of claim 1 wherein the intermediate nut defines a pair of elongate openings, the lower facing surface of the rear portion includes a pair of pins that extend into the pair of elongate openings.

7. The three-dimensional printing system of claim 6 wherein the lead screw nut defines a pair of openings, the intermediate nut has a lower side including a pair of pins that extend into the pair of elongate openings.

8. The three-dimensional printing system of claim 1 wherein the lead screw nut has a pair of openings and further comprising:
   a pair of bolts that that pass through the pair of openings and attach to the lateral surface of the rear portion to vertically secure the lead screw nut to the rear portion, the bolts are sized to allow for the lateral motion.

9. A three-dimensional printing system for fabricating a three-dimensional article comprising:
   a vertical support beam;
   a resin vessel assembly coupled to the vertical support beam and including a resin vessel;

a support tray positioning system including:
a support tray elevator including:
a rear portion that is proximate to the vertical support beam having a lower facing surface;
a pair of arms that extend from the rear portion in a forward direction, the pair of arms for supporting a support tray above the resin vessel;
an intermediate nut having an upper side facing the lower facing surface of the rear portion and having a lower side;
a lead screw nut having an upper side facing the lower side of the intermediate nut and defining a central threaded opening;
a motorized lead screw having a vertical axis and received into the central threaded opening of the lead screw nut, rotation of the motorized lead screw about the vertical axis raises and lowers the lead screw nut and the support tray elevator; and
a linear bearing that slides along the main vertical support beam along the vertical axis, the linear bearing is coupled to the rear portion to constrain motion of the rear portion to vertical motion;
the rear portion, the intermediate nut, and the lead screw nut collectively defining two pairs of elongate openings including a first pair of openings and a second pair of openings and including two pairs of pins including a first pair of pins that extend into the first pair of openings and a second pair of pins that extend into the second pair of openings, interactions between the pins and the elongate openings constrains rotational motion of the lead screw nut with respect to the lower portion along the vertical axis while allowing for lateral motion of the lead screw nut with respect to the rear portion to accommodate mechanical tolerances of the lead screw with respect to the linear bearing.

10. The three-dimensional printing system of claim 9 wherein the vertical support beam has a front side and a rear side, the linear bearing is slidingly mounted to the rear side of the vertical support beam.

11. The three-dimensional printing system of claim 10 wherein the rear portion is mounted to a rearward facing portion of the linear bearing.

12. The three-dimensional printing system of claim 11 wherein the rear portion extends laterally beyond a lateral extent of the vertical support beam on two sides, the pair of arms individually extend forwardly beyond the vertical support beam.

13. The three-dimensional printing system of claim 9 wherein the first pair of pins extend downwardly from the rear portion and the first pair of elongate openings are defined in the intermediate nut.

14. The three-dimensional printing system of claim 9 wherein the second pair of pins extend downwardly from the intermediate nut and the first pair of elongate openings are defined in the lead screw nut.

15. The three-dimensional printing system of claim 9 wherein the first pair of elongate openings have an aligned pair of major axes along a first direction, the second pair of elongate openings have an aligned pair of major axes along a second direction that is not parallel to the first direction to allow for two dimensional lateral motion of the lead screw nut with respect to the rear portion.

16. The three-dimensional printing system of claim 9 wherein the lead screw nut has a pair of openings and further comprising:
a pair of bolts that that pass through the pair of openings and attach to the rear portion to vertically secure the lead screw nut to the rear portion.

17. A three-dimensional printing system for fabricating a three-dimensional article comprising:
a vertical support beam;
a resin vessel assembly coupled to the vertical support beam and including a resin vessel;
a support tray positioning system including:
a support tray elevator including:
a rear portion that is proximate to the vertical support beam having a lower facing surface and including a pair of pins that extend from the lower facing surface;
a pair of arms that extend from the rear portion in a forward direction, the pair of arms for supporting a support tray above the resin vessel;
an intermediate nut:
having an upper side facing the lower facing surface of the rear portion;
defining a pair of elongate openings that receive the pins from the rear portion; and
having a lower side and including a pair of pins that extend downwardly from the lower side;
a lead screw nut:
having an upper side facing the lower side of the intermediate nut;
defining a pair of elongate openings that receive the pins from the intermediate nut; and
defining a central threaded opening;
a motorized lead screw having a vertical axis and received into the central threaded opening of the lead screw nut, rotation of the motorized lead screw about the vertical axis raise and lowers the lead screw nut and the support tray elevator; and
a linear bearing that slides along the main vertical support beam along the vertical axis, the linear bearing is coupled to the rear portion to constrain motion of the rear portion to vertical motion.

* * * * *